T. T. STRODE.
Calendar Clock.

No. 49,169.

Patented Aug. 1, 1865.

UNITED STATES PATENT OFFICE.

T. T. STRODE, OF MORTONVILLE, PENNSYLVANIA.

IMPROVEMENT IN CALENDAR-CLOCKS.

Specification forming part of Letters Patent No. 49,169, dated August 1, 1865.

*To all whom it may concern:*

Be it known that I, T. T. STRODE, of Mortonville, in the county of Chester and State of Pennsylvania, have invented a new and Improved Calendar-Clock; and I do hereby declare that the following is a full, clear, and exact description thereof, which will enable others skilled in the art to make and use the same, reference being had to the accompanying drawings, forming part of this specification, in which—

Figure 1:
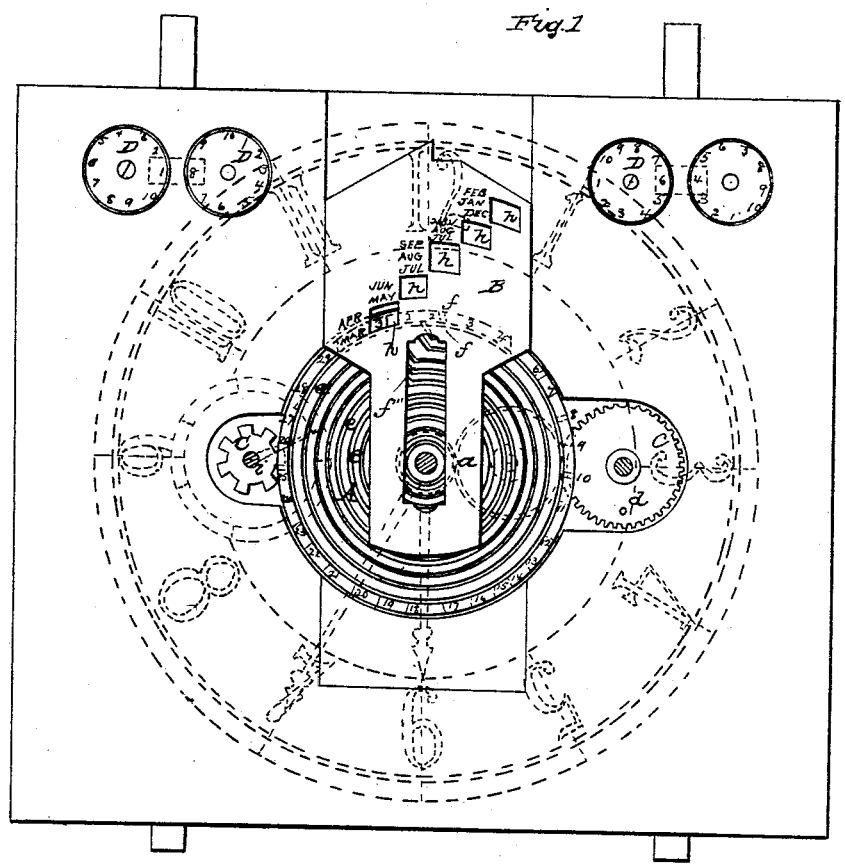
Figure 2:
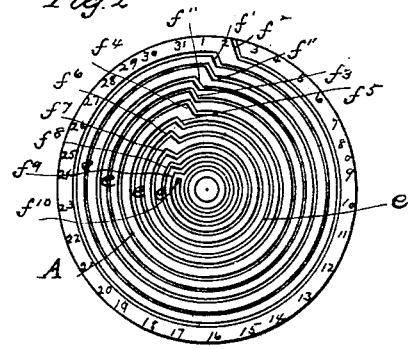

Figure 1 is a front elevation or face view of this invention, the dial being represented in red and the mechanism in black outlines. Fig. 2 is a front elevation of the month-wheel detached.

Similar letters of reference indicate like parts.

This invention consists in a reciprocating or oscillating slide marked with the names of the months, commencing with March and ending with February, and provided with openings opposite to said names, and with a projection which bears on a wheel the face of which is marked with figures from 1 to 31, to indicate the days of the months, and which is provided with eleven concentric grooves and oblique channels leading from the periphery of the wheel to the first groove, from the first groove to the second, and so forth, in such a manner that whenever the projection of the movable slide comes opposite to one of these channels said slide drops or moves and a new name of a month is brought in view and opposite to the figures on the rim of the month-wheel. The time when the slide changes from one groove to the other is determined by the position of the communicating channels which correspond to the number of days of the different months.

A represents the month-wheel, which is mounted on the central arbor of the clock in such a manner that it revolves independent of the same. It is provided on its under surface with cogs, and a train of wheels, *a b c*, are so adjusted that a pin, *d*, projecting from the wheel *c* propels the wheel A one cog for every day. There are thirty-one cogs, and consequently it takes thirty-one (31) days for the month-wheel to complete one revolution. The face of said month-wheel is marked with figures from 1 to 31, and it is furnished with eleven (11) concentric grooves, *e*, at suitable distances apart. Neither of these grooves, except that one nearest to the center, completes a full circle, and the first or largest groove communicates with the periphery of the wheel A by an oblique channel, *f*, and a similar channel, *f'*, leads from the first to the second groove, and so forth, as clearly shown in Fig. 2.

The names of the months are marked on a slide, B, which moves on the under side of the dial, between the same and the wheel A. It is provided with a projection, *g*, on its under side, which bears on the periphery, or on one of the concentric grooves of the wheel A, and prevents the slide from dropping toward the center of the clock. Said slide may either be hinged or it may move vertically up and down, as shown in the drawings, and it may be made to bear on the month-wheel simply by its gravity, or, if desired, a thin spring may be added to keep the projection *g* in close contact with said wheel. The names of the months marked on this slide are opposite to openings *h*, through which one of the numbers on the face of the month-wheel is visible, and the name of the month and the number of the day are thus shown in close proximity to each other.

A small wheel, C, with seven (7) cogs, which gear in the cogs of the month-wheel, serves to indicate the days of the week. Said week-wheel is mounted on an arbor, *i*, which bears an index-hand moving on a small dial marked on the face of the clock, as shown in Fig. 1 of the drawings, and it is propelled one cog every twenty-four (24) hours.

The number of the year is shown by four (4) disks, D, which are marked with figures from 0 to 9, and placed opposite to openings in the main dial. They are set by hand at the beginning of every year.

The operation of the month-wheel and its slide is as follows: The names on the slide commence with the month of March, which is nearest to the center, and they terminate with February, which is farthest from the center, as shown clearly in Fig. 1 of the drawings, and at the beginning of the month of March the projection *g* of the slide bears on the periphery of the month-wheel, and the month-wheel is in such a position that the figure 1 on its rim can be seen through the opening opposite the name of March. As the month-wheel rotates in the direction of the arrow marked on it in Fig. 1 one figure after the other is brought under the opening, and at the end of the month the figure thirty-one (31) is visible through said opening, as shown. At the beginning of the next day, or at midnight between the 31st of March and the 1st of April, the channel $f$ leading from the periphery of the month-wheel to the first groove passes under the projection $g$, and the slide, impelled by its own gravity, drops down, so that the projection bears on the first groove and the name "April" is visible through the aperture in the dial. At the same time the figure 1 on the rim is brought in view through the opening in the slide opposite the name "April." The first groove terminates in an oblique channel, $f'$, which is so situated that the slide changes from the first to the second groove at the end of the 30th day, when the name "May" is brought in view, and so forth for each succeeding month.

In order to skip the figure 31 at the end of those months which have only thirty (30) days the names of the months and the openings opposite to them are placed in an oblique position, so that if the slide changes from April to May the figure 31 on the rim of the month-wheel is covered up and the figure 1 exhibited, and the same as the slide changes from June to July, from September to October, and from November to December.

The last groove in the month-wheel nearest to its center is continuous. This groove corresponds to the month of February, and at the end of that month the slide must be raised up, which is done by turning the month-wheel back. All complicated mechanism is thus avoided.

If February has twenty-eight (28) days the slide is raised on that day, and if it happens to have twenty-nine (29) days the slide is raised on that day, and if the operation should be omitted on the precise day it can be readily done on any other day whenever the omission is noticed.

The month-wheel can be readily set for any day of the year.

It must be remarked that the same effect would be produced by using one projection on the slide for each month, said projections being placed in the same order on the slide as the openings between the grooves now are on the month-wheel. Then all the face on the month-wheel between the figure-ring and axle must be removed to the depth of the present grooves. Again, the same effect can be produced after the face of the month-wheel is cut away, as above described, from the figure-ring to the axle; then, by having one projection on each side of the plate containing the names of the months, the inside projection being as it now is in the drawings, and the outside projection being right opposite; then let there be ten (10) pins or projections in the face of the month-wheel, said pins occupying the same position as the last ten (10) openings between the month-wheel grooves. Then there must be a zigzag opening in the dial-plate, from the figure-ring to axle, in form of the one shown. Then the projection on the inside of said plate would pass around on the periphery of the month-wheel, as it now does, and drop through the first opening, as it now does. Then the outer projection would catch in the notches in the dial-opening, and be removed therefrom by one after another of said ten (10) projections in the face of the month-wheel coming in contact with the projection on the inside of said plate at the end of each month, except March and February. The construction which I have shown, however, is the simplest and easiest to make, and a calendar-clock made according to my invention recommends itself by its great simplicity.

I claim as new, and desire to secure by Letters Patent—

The slide B, marked with the names of the months and provided with openings $h$, to operate in combination with the wheel A, marked with figures from 1 to 31, and provided with concentric grooves $e$, substantially in the manner and for the purpose herein set forth.

THOMAS T. STRODE.

Witnesses:
ROBT. B. STEEN,
JAMES WILSON.